United States Patent

[11] 3,625,568

| [72] | Inventor | Henri Verdier<br>Puy-de-Dome, France |
| [21] | Appl. No. | 838,116 |
| [22] | Filed | July 1, 1969 |
| [45] | Patented | Dec. 7, 1971 |
| [73] | Assignee | Compagnie Generale Des Establissements<br>Michelin raison sociale Michelin & Cie<br>Clermont-Ferrand, Puy-de-Dome, France |
| [32] | Priorities | July 2, 1968 |
| [33] | | France |
| [31] | | 157608;<br>May 22, 1969, France, No. 69/16833 |

[54] METHOD OF MAKING DISK WHEEL
8 Claims, 6 Drawing Figs.

[52] U.S. Cl. .................................................. 301/63 R,
29/159.01, 29/480, 29/487
[51] Int. Cl. .................................................. B60b 1/06
[50] Field of Search .................................... 29/159.01,
159.1, 487, 480; 301/63, 95, 99

[56] References Cited
UNITED STATES PATENTS

| 2,751,675 | 6/1956 | Bieber .......................... | 29/480 X |
| 2,818,303 | 12/1957 | Main et al. ..................... | 301/63 |
| 2,830,168 | 4/1958 | Taylor .......................... | 29/159.01 X |
| 3,117,369 | 1/1964 | Albert .......................... | 29/159.01 X |
| 3,432,207 | 3/1969 | Holmstrom ..................... | 29/159.01 X |

Primary Examiner—John F. Campbell
Assistant Examiner—Victor A. DiPalma
Attorney—Brumbaugh, Graves, Donohue and Raymond ABSTRACT: A disk and a rim are assembled to form a wheel and are joined by welding spots. Punches or milling tools are simultaneously applied to opposite sides of the disk and rim and pressed together with sufficient force to form a permanent impression adjacent to each welding spot. This established a compressive reinforcement in the region of each welding spot.

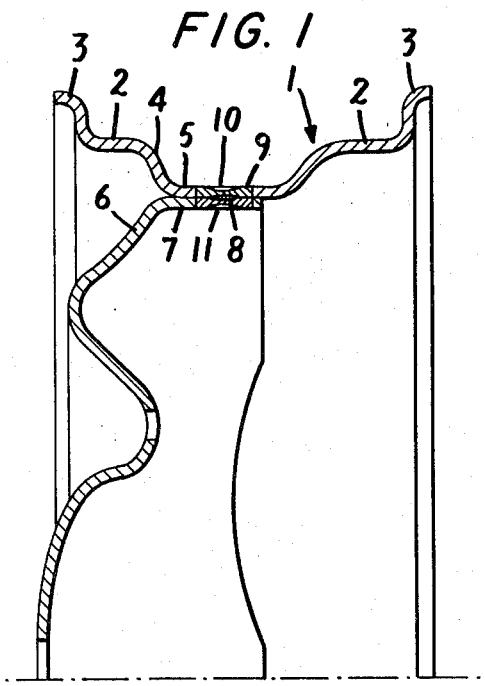
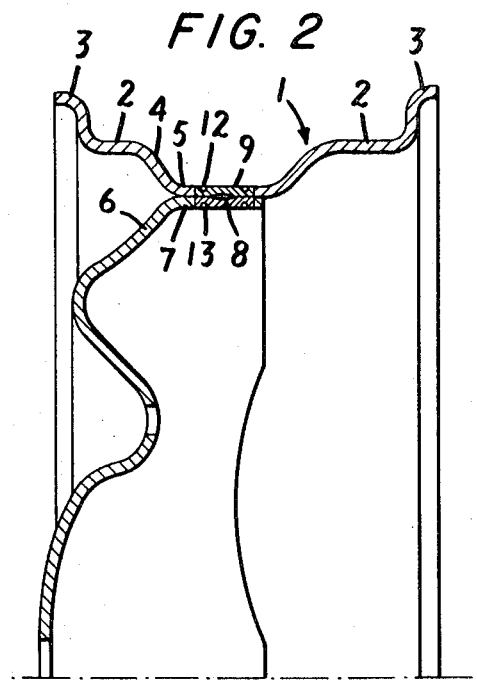
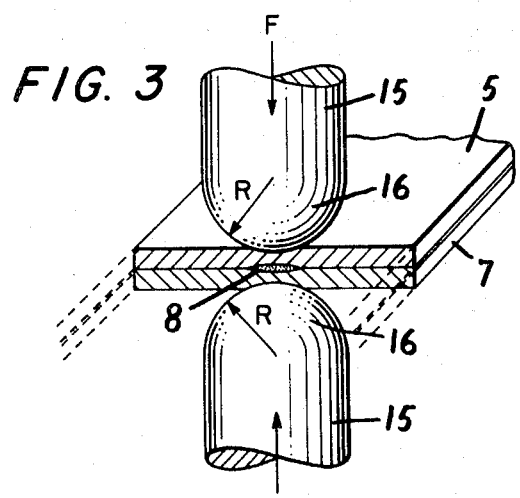
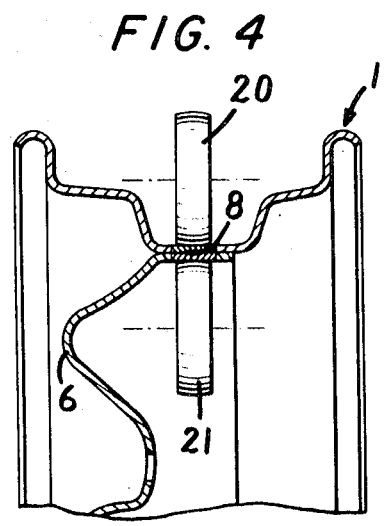
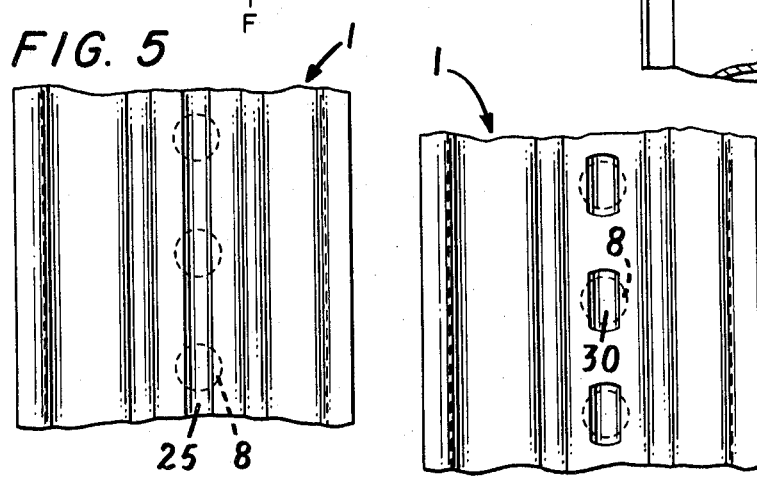
INVENTOR
HENRI VERDIER

METHOD OF MAKING DISK WHEEL

BACKGROUND OF THE INVENTION

This invention relates to wheels for automotive vehicles and, more particularly, to wheels comprising a disk and a rim assembled to each other by spot welding all along cylindrical or substantially cylindrical parts of the two elements, such as the outer edge of the disk and the base of the rim.

The wheels of modern automotive vehicles must be designed to withstand greater and greater speeds during long periods and must at the same time be made as light as possible in order not to constitute too great an unsuspended weight. Light wheels operated at high speed tend to suffer fatigue. Metal fatigue results in fissures, which tend to originate especially at the points of assembly between the disk and the rim. Fissuring results first in a progressive loss of tightness of the rim, and then in a premature breaking down of the wheel.

In order to improve resistance to fatigue, it is not sufficient merely to increase the number of welding spots between the disk and the rim. This expedient merely increases the number of points at which fissuring due to fatigue is likely to occur due to the cyclic localization of the stresses to which the wheel and its components, the disk and rim, are subjected. The indicated solution, then, is to increase the individual resistance of the welding spots rather than their number.

SUMMARY OF THE INVENTION

An object of the invention is to improve the assembly of a rim and a disk obtained by spot welding in order to provide improved resistance to stresses, improved resistance to fissuring due to fatigue, and improved impermeability of the welding spots taken individually and therefore to provide a wheel that, as compared to conventional wheels, can bear greater weights and withstand greater speeds for a longer period of time and therefore offer greater security, without necessarily any increase in weight. Another object of the invention is to permit the use of spot welding for the assembly of the disk and the rim of a wheel made of sheet metal (which has little thickness), which before this invention could be satisfactorily assembled only by riveting.

The foregoing and other objects of the invention are attained by the provision of welding spots that are reinforced by compression of the metal on the two surfaces of the assembly, this compression bringing about on at least one of the surfaces the formation of a permanent impression or molding covering a surface having an area equaling at least the adjacent surface area of a welding spot.

In one embodiment of the invention, the impression extends over at least part of the interval between successive welding spots. In another embodiment, the impression or molding is continuous along a circumferential area, covering all welding spots and the intervals between them.

BRIEF DESCRIPTION OF THE DRAWING

An understanding of additional aspects of the invention can be gained from a consideration of the following detailed description of representative embodiments thereof, in conjunction with the accompanying figures of the drawings, wherein:

FIGS. 1 and 2 are radial half-sections of first and second embodiments, respectively, of wheels constructed in accordance with the invention;

FIG. 3 is a perspective view, on a larger scale, of impression forming means including two punches applied against a welding spot joining two thin metal sheets;

FIG. 4 is a view similar to FIGS. 1 and 2, representing a welding spot compressed between impression-forming means including two milling rollers, and FIGS. 5 and 6 are plan views of a rim portion, FIG. 5 showing a single continuous impression and FIG. 6 showing discontinuous impressions.

DESCRIPTION OF THE PREFERRED EMBODIMENTS

The process of spot welding produces welding spots that are subjected to residual expansion stresses resulting from the contraction of the metal in the area of fusion when it cools, the contracting metal being surrounded by a colder metal. The crushing of the welding spot by producing a plastic deformation on one or both sides of the fusion area in accordance with the invention nullifies these expansion stresses and replaces them with residual compression stresses. It is in the metal subject to expansion stresses that the fatigue cracks and fissures generally originate. The compression stresses established around the welding spots in accordance with the invention do not give way to expansion stresses unless the metal undergoes a stretching or tensile force sufficient to cancel out the compression prestress. In this way, the expansion stresses on the metal around the welds are minimized or prevented. Fissures due to fatigue which can eventually result from expansion stresses and bring about the weakening of the assembly, loss of tightness, and the development of corrosion are also minimized or prevented.

In the case of individual impressions each covering a surface substantially equal in area to the adjacent surface area of a welding spot, the compression of the metal, according to the invention, can be achieved cold by means of impression-forming means such as punches having, for example, hemispherical heads. The punches are opposed simultaneously to the two surfaces of the welding spots with sufficient pressure to obtain a permanent molding or impression on either side of the spot.

The use of hemispherical punches results in the generation in the metal of compression strains which do not have any preferential orientation in any direction whatever. In such a case, the impression applied to the surface of the metal is in the shape of a spherical cup. However, it is also possible to use punches with a head having a shape other than hemispherical, for example, the form of a ring-shaped projection impressing all around the welding spot a groove running in a circle with a profile that in cross section is concave and either circular or triangular. Cold working is preferred: i.e., working at room temperature or at a temperature which does not cause any thermal modification of the metal. The method employing punches having a ring-shaped projection can be applied to advantage in the assembly of metal plates whose thicknesses do not exceed 1 to 1.5 millimeters.

In the case of metal plate rims or disks with thicknesses ranging from 1 to 3 mm., hemispherical head punches can be used whose radius ranges from 10 to 25 mm. and which are applied with a force ranging from 5 to 20 tons. Thereby one obtains impressions with a diameter of 5 to 10 millimeters on the surface of the metal and a depth of a few tenths of a millimeter. It is desirable that the impression be centered as accurately as possible on the welding spot and that any off centering not exceed 1 to 2 millimeters.

In the case of welding spots obtained means of electrodes with a cross section other than circular, for example oval, it is advisable to adapt the shape of the punches to the shape of the electrodes.

In individual impressions extending each over at least part of the interval between successive points of welding and also in the case in which the impression is continuous along a circumferential area covering all welding spots and the spaces separating them, cold compression of the metal is effected, in accordance with the invention, by means of impression-forming means such as two milling wheel tools which are caused to roll all along said area.

The contact between the wheel and the milling tools can be constant, in which case one obtains a continuous impression circling the rim and the disk. It can also be intermittent, in which case one obtains a series of elongated impressions each covering one or more welding spots.

This system makes it possible to avoid centering difficulties in impressions which have substantially the form and the dimension of the welding spots. Even if the positioning of the milling tools is not very precise in an axial direction, the compression of the metal in the area of the welding spots is assured.

FIGS. 1 and 2 show a rim 1 of a vehicle wheel, comprising two bead seats 2, two edges 3, and one groove 4 the base 5 of which is substantially cylindrical. To this rim 1 is assembled a disk 6 along its cylindrical edge 7. A welding spot 8 in the middle of the hatched area 9 of compressive reinforcement joins the rim 1 and disk 6. For the sake of clarity of the drawing, the size of the welding spot 8 has been exaggerated.

FIG. 1 shows on either side of the welding spot 8, on the outer surface of the rim base 5 and the inner surface of the edge 7 of the disk, two impressions 10 and 11 each in the shape of a spherical segment the surface diameter of which is close to the diameter of the welding spot and the depth of each of which is slightly less than half of the thickness of the metal of the disk or the rim.

In the embodiment of FIG. 2, the spherical impressions 10 and 11 do not appear and, instead, there are ring-shaped impressions 12 and 13 extending circumferentially of the rim and disk.

FIG. 3 shows, on either side of the welding spot 8, between the metal plate 5 and the metal plate 7, impression-forming means including two punches 15 each ending in a hemispherical head 16 having a radius R. These punches are pressed together with a force F, as shown by the arrows, and establish a compressive reinforcement operatively associated with the welding spot 8.

As two numerical examples, wheels such as the one shown in FIG. 1 can be manufactured with the tools shown in FIG. 3, under the following conditions:

|  | Example I | Example II |
| --- | --- | --- |
| wheel size | 4Jx15 | 5Jx15 |
| thickness of the rim (at the rim base) | 1.8 mm. | 2.8 mm. |
| thickness of the disk (at the edge) | 1.8 mm. | 3.0 mm. |
| number of welding spots | 12 | 12 |
| diameter of the electrode used for welding | 12 mm. | 12 mm. |
| diameter of welding spots | approx. 10 mm. | approx. 10 mm. |
| radius R | 25 mm. | 25 mm. |
| force F | 10 tons | 12 tons |
| diameter of impression in surface | 8.5 mm. | 8.5 mm. |

These wheels have a resistance to fatigue which equals the resistance of wheels manufactured with thicker metal plate (thicker by several tenths of a millimeter) assembled without making use of the invention, and at least equals the resistance of wheels manufactured by means of the same elements–disk and rim–assembled by riveting.

It goes without saying that the above numerical indications are given only as examples and could be modified while remaining within the scope of the invention.

FIG. 4 is a radial cross section of a rim 1 joined to a disk 6 by welding spots 8. The welding spot zone is compressed by impression-forming means such as two milling rollers 20 and 21 which are pressed against each other by any suitable means (not shown).

FIGS. 5 and 6 are plan views of a rim portion. Each of them shows three consecutive welding spots 8. FIG. 5 also shows a circular impression 25 having substantially the width of the welding spots and having a depth of some tenths of a millimeter and having been produced by the movement of the milling tools 20 and 21. In FIG. 6, the continuous circular impression 25 is replaced by discontinuous impressions 30 each having a length (in the direction of the circumference of the wheel) exceeding the length (in the direction of the circumference of the wheel) of a corresponding welding spot 8. The discontinuous impressions 30 are also produced by the milling tools 20 and 21 exerting on the rim and the disk a variable or intermittent pressure.

In all the examples described above, it is possible to crush the welding spots on only one of their surfaces, preferably the surfaces adjacent to the rim 1. This can be done by using only one punch or only one milling tool, which bears on the rim 1, the disk 6 being supported by a bearing surface or gripping means which does not create an impression therein.

Thus there is provided in accordance with the invention a novel and highly effective wheel and method of making the same. Many modifications of the invention will readily occur to those skilled in the art. For example, a wide variety impression-forming means may be used in accordance with the invention. Accordingly, the invention is to be construed as including all the embodiments thereof within the scope of the appended claims.

I claim:

1. A wheel comprising a disk, a rim, and a plurality of welding spots in spaced-apart relation to each other joining said disk and rim, at least one of said disk and rim being formed with a permanent impression in superimposed relation to each spot of said plurality of welding spots and covering a surface area at least substantially as large as the surface area of the welding spot opposed thereto and said disk and rim being formed with a compressive reinforcement in superimposed relation to each spot of said plurality of welding spots, whereby each spot of said plurality of welding spots is under compressive stress.

2. A wheel according to claim 1 wherein the permanent impression in superimposed relation to each spot of said plurality of welding spots extends over at least part of the space between adjacent ones of said welding spots.

3. A wheel according to claim 1 wherein the permanent impression in superimposed relation to one of said plurality of welding spots merges into the permanent impression in superimposed relation to the welding spot adjacent thereto.

4. A method of making a wheel comprising the steps of assembling a disk and a rim, forming welding spots joining said disk and rim, applying impression-forming means simultaneously to said disk and rim on opposite sides of said welding spots, and pressing said impression-forming means together with sufficient force to form a permanent impression in superimposed relation to each welding spot, whereby a compressive reinforcement is established operatively associated with each welding spot and substantially the entirety of each welding spot is placed under compressive stress.

5. A method according to claim 4 comprising the step of forming said permanent impression by cold working with hemispherical punch means having a radius within the range of 10 to 25 millimeters, said force being within the range of 5 to 20 tons, said impression having a maximum depth several tenths of a millimeter and a diameter within the range of 5 to 10 millimeters.

6. A method of making a wheel comprising the steps of assembling a disk and a rim, forming welding spots joining said disk and rim along a circumferential zone of said wheel and rim, applying impression-forming means simultaneously to said disk and rim on opposite sides thereof in said circumferential zone, pressing said impression-forming means together with sufficient force to form a permanent impression in at least one of said disk and rim, and effecting relative movement of said disk and rim with respect to said impression-forming means along said circumferential zone, whereby a compressive reinforcement is established operatively associated with each welding spot and substantially the entirety of each welding spot is placed under compressive stress.

7. A method according to claim 6 comprising the step of pressing continuously during said movement.

8. A method according to claim 6 comprising the step of pressing intermittently during said movement.

* * * * *